US011192580B2

United States Patent
Obermüller et al.

(10) Patent No.: US 11,192,580 B2
(45) Date of Patent: Dec. 7, 2021

(54) METHOD FOR STEERING A VEHICLE

(71) Applicant: AUDI AG, Ingolstadt (DE)

(72) Inventors: Anton Obermüller, Ingolstadt (DE);
Adrian Mihailescu, Ingolstadt (DE);
Martin Enning, Ingolstadt (DE);
Matthias Lehmann, Freising (DE);
Christian Wiedenmann, Ingolstadt (DE); Michael Ortlechner, Ingolstadt (DE); Ferdinand Hartinger, Munich (DE); Klaus Diepold, Kissing (DE);
Michael Schiffer, Mönchengladbach (DE)

(73) Assignee: AUDI AG, Ingolstadt (DE)

( * ) Notice: Subject to any disclaimer, the term of this patent is extended or adjusted under 35 U.S.C. 154(b) by 135 days.

(21) Appl. No.: 16/629,111

(22) PCT Filed: Jun. 13, 2018

(86) PCT No.: PCT/EP2018/065611
§ 371 (c)(1),
(2) Date: Jan. 7, 2020

(87) PCT Pub. No.: WO2019/025066
PCT Pub. Date: Feb. 7, 2019

(65) Prior Publication Data
US 2020/0207411 A1    Jul. 2, 2020

(30) Foreign Application Priority Data

Aug. 2, 2017    (DE) .................... 10 2017 213 332.5

(51) Int. Cl.
*B62D 6/00*    (2006.01)
*B62D 7/15*    (2006.01)
*B62D 15/02*   (2006.01)

(52) U.S. Cl.
CPC .............. *B62D 6/003* (2013.01); *B62D 7/15* (2013.01); *B62D 15/021* (2013.01)

(58) Field of Classification Search
CPC ........ B62D 6/003; B62D 7/15; B62D 15/021; B62D 5/008
See application file for complete search history.

(56) References Cited

U.S. PATENT DOCUMENTS

| 6,640,923 B1 | 11/2003 | Dominke et al. |
| 2012/0197496 A1 | 8/2012 | Limpibunterng et al. |
| 2017/0274928 A1* | 9/2017 | Minaki .................... B62D 5/04 |

FOREIGN PATENT DOCUMENTS

| DE | 43 26 992 C2 | 7/1996 |
| DE | 102 01 704 A1 | 9/2002 |

(Continued)

OTHER PUBLICATIONS

English-language translation of International Preliminary Report on Patentability and Written Opinion dated Feb. 13, 2020 in corresponding International Application No. PCT/EP2018/065611; 8 pages.

(Continued)

*Primary Examiner* — Marthe Y Marc-Coleman
(74) *Attorney, Agent, or Firm* — Maier & Maier, PLLC

(57) ABSTRACT

A method for steering a vehicle, having a front axle with steerable wheels, a rear axle with steerable wheels, having a steering system including as its components a steering wheel operable by the driver and at least one automatic steering module, wherein a manual primary steering intervention is undertaken by the driver of the vehicle for the steering wheel, on the basis of which a manual primary steering reaction occurs for the wheels of the front axle, wherein on the basis of the manual primary steering reaction at least one automatic secondary steering intervention is undertaken (Continued)

with the at least one automatic steering module for the wheels of at least one axle.

13 Claims, 1 Drawing Sheet

(56) References Cited

FOREIGN PATENT DOCUMENTS

| | | |
|---|---|---|
| DE | 10 2007 020 169 A1 | 10/2007 |
| DE | 10 2010 036 619 A1 | 1/2012 |
| DE | 10 2011 051 964 A1 | 1/2013 |
| EP | 1 342 642 A2 | 9/2003 |
| WO | 2016/167256 A1 | 10/2016 |

OTHER PUBLICATIONS

Examination Report dated May 3, 2018 in corresponding German application No. 10 2017 213 332.5; 16 pages including Machine-generated English-language translation.

International Search Report and Written Opinion of the International Searching Authority dated Nov. 15, 2018 in corresponding International application No. PCT/EP2018/065611; 26 pages including Machine-generated English-language translation.

* cited by examiner

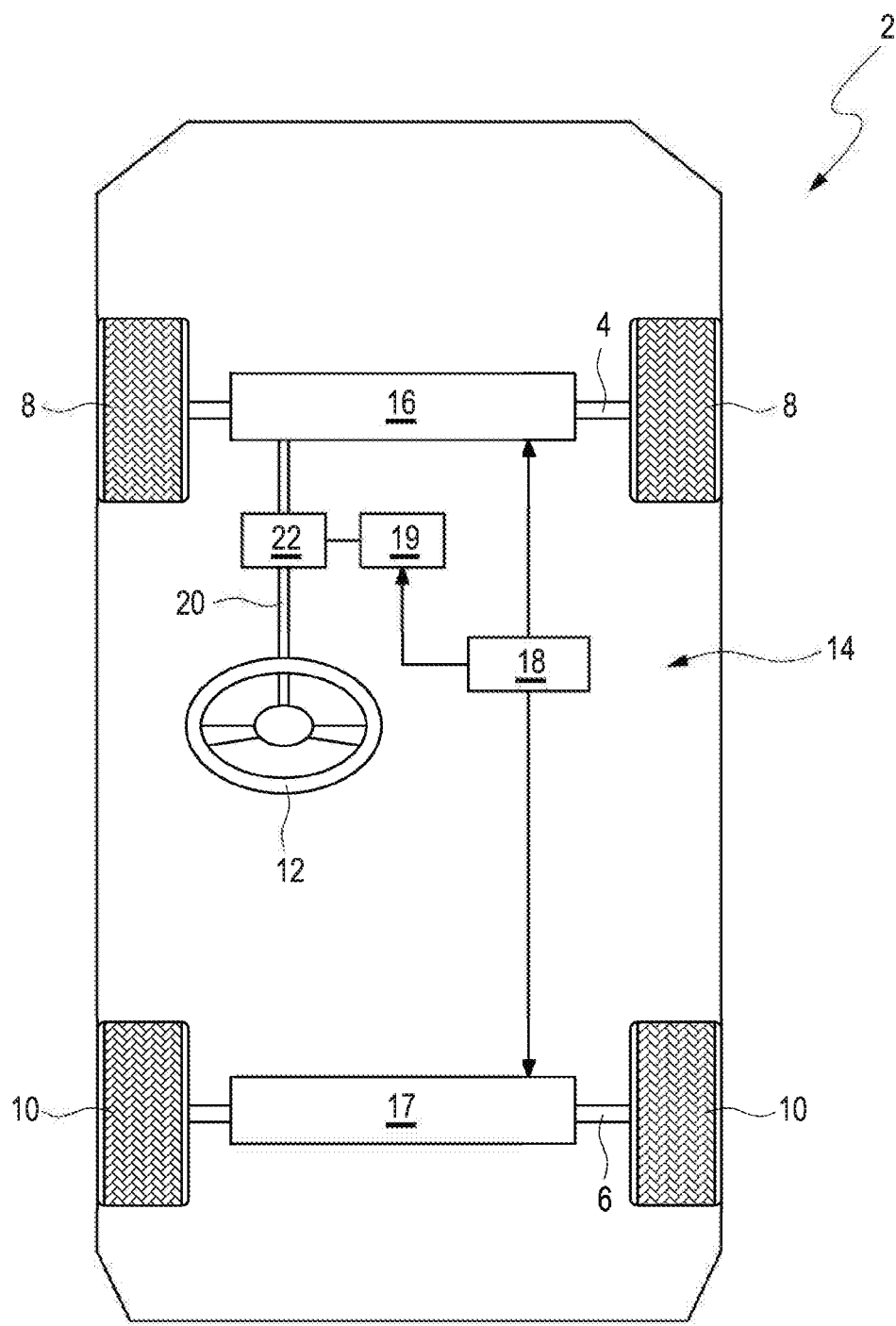

METHOD FOR STEERING A VEHICLE

FIELD

The disclosure relates to a method for steering a vehicle, and a steering system for steering a vehicle.

BACKGROUND

A vehicle may comprise an active steering system, designed for example as a superimposed steering or dynamic steering and/or rear axle steering, and it influences the steering feel of the driver. Such a vehicle with an active steering system generally also comprises an electromechanical steering (EPS), which is designed to define a manual steering torque and thus influence a steering feel of the driver of the vehicle.

An electrically operated servosteering system is known from document DE 43 26 992 C2. Document DE 102 01 704 A1 describes a controller for an electrical servosteering.

A method for operating an electrical servosteering device of a motor vehicle is described in the document DE 10 2011 051 964 A1.

Given this background, one problem which the present invention proposes to solve was to limit the influence of an active steering system on the steering wheel of a vehicle.

SUMMARY

This problem is solved with a method and a steering system having the features of the independent patent claim. Embodiments of the method and the steering system will emerge from the disclosure.

The method according to the invention is proposed for steering a vehicle, wherein the vehicle has a front axle with steerable wheels and a rear axle with steerable wheels, wherein the steering is implemented by an active steering system comprising as its components a steering wheel operable by the driver and at least one automatic active steering module. In the method, a manual primary steering intervention is undertaken by the driver of the vehicle for the steering wheel, whereby or on the basis of which a manual primary steering reaction occurs for the wheels of the front axle, whereupon on the basis of the manual primary steering reaction at least one automatic secondary steering intervention is undertaken with the at least one automatic steering module for the wheels of at least one axle, i.e., for the wheels of the front axle or the rear axle. Furthermore, an anticipated secondary steering reaction of the steering wheel is calculated as the effect of this at least one automatic secondary steering intervention. An additional automatically set tertiary steering intervention for the steering wheel is ascertained from this anticipated secondary steering reaction and is performed by the at least one automatic steering module for the steering wheel.

By performing at least one steering intervention for at least one of the components of the steering system, an angle and/or a torque is set for this at least one component, whereupon an angle and/or a torque is set for at least one further component of the steering systems, resulting as a steering reaction to the steering intervention. Depending on the definition, an angle or torque is set for the performing of the steering intervention for the one component, resulting in a torque or an angle for this one component and/or an angle and/or torque for the at least one further component as a steering reaction.

In an embodiment, the manual primary steering intervention is undertaken by the driver of the vehicle for the steering wheel, whereupon a primary manual steering wheel angle is set as the angle and/or a primary manual steering wheel torque is set as the torque for the steering wheel. This produces the manual primary steering reaction for the wheels of the front axle, whereupon a primary manual steering angle is set as the angle and/or a primary manual steering torque is set as the torque for the wheels of the front axle. On the basis of the manual primary steering reaction, the at least one automatic secondary steering intervention is undertaken with the at least one automatic steering module for the wheels of at least one axle, whereupon a secondary automatic steering angle is set as the angle and/or a secondary automatic steering torque is set as the torque for the wheels. A secondary steering wheel angle is calculated as the angle and/or a secondary steering wheel torque is calculated as the torque of the anticipated secondary steering reaction of the steering wheel. From this anticipated secondary steering reaction, a tertiary steering wheel angle is ascertained as the angle and/or a tertiary steering wheel torque is ascertained as the torque of the additional automatically set tertiary steering intervention, which is set by the at least one automatic steering module for the steering wheel.

In an embodiment, a primary steering wheel angle is manually set by the driver of the vehicle for the steering wheel during and/or by providing the manual primary steering wheel torque, thereby manually setting a steering angle for the wheels of the front axle as the effect of the manual steering wheel angle. Furthermore, at least one automatic steering angle is set with the at least one automatic active steering module for the wheels of at least one axle, i.e., the front axle and/or the rear axle, as a secondary steering reaction. Based on this, the anticipated steering wheel torque is calculated as the effect or the secondary steering reaction of this at least one automatically set steering angle, whereupon the additional steering wheel torque to be automatically set is ascertained from this effect as a tertiary steering intervention and applied to the steering wheel, automatically setting an additional steering wheel angle.

Depending on the definition, the angle and/or the torque is designed and/or designated as the operating parameter of the steering intervention and/or the steering reaction.

The at least one automatic active steering module acts between the steering wheel and the wheels of the front axle and is adapted to act on the steering wheel and/or the wheels of the front axle. It is also possible for the at least one automatic steering module to be adapted to act on the wheels of the rear axle. In this process, the at least one automatic torque and/or the at least one automatic angle is set by the at least one automatic steering module for the wheels.

The at least one automatic secondary steering intervention and/or the resulting secondary steering reaction is compensated with the additional automatically set steering wheel torque as a tertiary steering intervention. In an embodiment, the effect of the at least one automatic steering angle is compensated with the additional automatically set steering wheel torque. The wheels are generally steered by the at least one automatically set steering angle in addition to the steering angle manually set by the driver, wherein the at least one automatically set steering angle is superimposed on the manually set steering angle. A resulting movement of the wheels by the at least one automatically set steering angle in turn acts on the steering column, which connects the front axle to the steering wheel, and also on the steering wheel, resulting in the anticipated steering wheel torque which is calculated in the method. The additional automatically set steering wheel torque compensating for the effect of the at least one automatically set steering angle is calculated before the effect acts on the steering wheel. The additional automatically set steering wheel torque is set for the steering wheel when the effect or the anticipated steering wheel torque is acting on the steering wheel.

The additional tertiary steering intervention to be set automatically is determined in dependence on the at least one automatically set secondary steering interventions and/or in dependence on at least one time derivative, i.e., the first or second derivative, of the automatically set secondary steering intervention.

In an embodiment, the tertiary steering intervention, such as the additional automatically set steering wheel torque, is ascertained solely in dependence on the automatically set secondary steering intervention, such as the at least one automatically set steering angle.

The additional automatically set steering wheel torque to compensate for the effect is ascertained, e.g., calculated and/or set, in dependence on at least one time derivative of the automatically set steering angle, i.e., in dependence on a first time derivative or an automatically set steering angle velocity of the automatically set steering angle and/or in dependence on a second time derivative or an automatically set steering angle acceleration of the automatically set steering angle, the respective time derivative of the automatically set steering angle being dependent on this.

In an embodiment, the secondary steering intervention is performed or set for the at least one wheel and at the same time the additional automatically set tertiary steering intervention is performed or set for the steering wheel. It is proposed that the secondary steering reaction is calculated before the secondary steering intervention is performed, the tertiary steering intervention being calculated from this secondary steering reaction which is to be calculated. The secondary and tertiary steering intervention are undertaken and thus set at the same time by the at least one automatic active steering module.

In an embodiment, the at least one automatic steering angle is set for the at least one wheel and at the same time the additional automatically set steering wheel torque is set for the steering wheel, being dependent upon the anticipated steering wheel torque, which in turn is dependent thereupon as the effect of the at least one automatically set steering angle.

Furthermore, the at least one automatically set secondary steering intervention, the anticipated secondary steering reaction as an effect of the at least one automatically set secondary steering intervention and/or the additional automatically set tertiary steering intervention are determined dependent upon at least one operating variable of the vehicle.

In an embodiment, the at least one automatic steering angle, the anticipated steering wheel torque as the effect of the at least one automatically set steering angle, and/or the additional automatically set steering wheel torque are determined, e.g., calculated or set, dependent upon the at least one operating variable of the vehicle, e.g., dependent upon a yaw rate or a yaw angle of the vehicle, the manually set steering angle, a manually set steering angle velocity, a velocity of the vehicle and/or a transverse acceleration of the vehicle.

In addition, it is possible to ascertain, e.g., calculate and/or set, the at least one automatic steering angle, the anticipated steering wheel torque as the effect of the at least one automatically set steering angle and/or the additional automatically set steering wheel torque by taking into account a single-track model of the vehicle.

The steering system according to the invention is designed for steering a vehicle, having a front axle with steerable wheels and a rear axle with steerable wheels, and it comprises as its components a steering wheel operable by the driver, a controller, and at least one automatic steering module. A manual primary steering intervention is to be undertaken by the driver of the vehicle for the steering wheel, whereby a manual primary steering reaction results for the wheels of the front axle. The at least one automatic steering module is adapted, on the basis of the manual primary steering reaction, to undertake at least one automatic secondary steering intervention for the wheels of at least one axle. The controller is adapted to calculate an anticipated secondary steering reaction of the steering wheel as an effect of this at least one automatic secondary steering intervention of the at least one steering modules, to ascertain from this anticipated secondary steering reaction an additional automatically set tertiary steering intervention, and to command the at least one automatic steering module to undertake the tertiary steering intervention for the steering wheel.

The at least one steering module is adapted to act upon the wheels of the at least one axle as well as the steering wheel.

Generally at least one steering module, acting on the steering wheel and the wheels of the front axle, is adapted to perform the additional automatically set tertiary steering intervention for the steering wheel. The at least one steering module is adapted to transmit an action of the steering wheel based on a steering intervention and/or a steering reaction of the steering wheel to the wheels of the front axle as well as an action of the wheels of the front axle based on a steering intervention and/or a steering reaction of the wheels to the steering wheel.

In an embodiment, the driver of the vehicle is able to manually set the steering wheel angle for the steering wheel during operation and/or by providing the manual steering wheel torque, so that the steering angle can be set manually for the wheels of the front axle. The at least one automatic active steering module is adapted to set the at least one automatic steering angle for the wheels of the at least one axle. The controller is designed to calculate the anticipated steering wheel torque as the effect of this at least one automatically set steering angle and to ascertain from this effect the additional automatically set steering wheel torque, to apply the additional automatically set steering wheel torque to the steering wheel and thus to automatically set the additional steering wheel angle.

With one embodiment of the steering system according to the invention, during the implementing of one embodiment of the method according to the invention it is possible to compensate for an influence of the at least one actively automatically set steering angle as a secondary steering intervention of the vehicle, such as a motor vehicle, on the steering column as well as the steering wheel and thus a steering train, so as not to influence the steering feel of the driver who is manually operating the steering wheel on account of the at least one actively automatically set steering angle.

The at least one automatic active steering module of the automatic active steering system is designed as a superimposed steering, a dynamic steering, and/or a rear axle steering. At least one active steering module is designed as a steering wheel torque actuator so as to act upon and thus influence the steering column and thus the steering wheel based on the at least one automatically set steering angle and also it is designed for example as an electromechanical steering (EPS). Hence, the steering angle and the steering wheel torque can be set with this steering module.

With the method, it is possible for at least one automatic steering intervention, i.e., the at least one steering angle which is automatically set by the at least one automatic active steering module as an actuator, to not negatively affect the steering wheel and thus the steering feel.

In the method, the additional automatically set steering wheel torque is ascertained and set at a time when the at least one steering angle is automatically set for the wheels. Hence, it is possible to set the automatic steering angle as the original cause and also the additional automatic set steering wheel torque for the steering wheel at the same time. The additional automatically set steering wheel torque is dependent on the anticipated steering wheel torque, which in turn is dependent on the automatic steering angle.

Hence, it is possible for the tertiary steering intervention, such as the additional automatically set steering wheel torque, and the secondary steering intervention, such as the automatically set steering angle whose effect is to be compensated by the additional automatically set steering wheel torque, to have the same phase. This prevents an influencing of the effect of the secondary steering intervention, such as the automatic steering angle, on the steering wheel in a phase-leading or phase-lagging manner.

With the controller, an actuating function is carried out for the active steering system, wherein the controller is used to ascertain, such as calculate, the at least one automatic steering angle by taking account of the at least one operating variable of the vehicle. At the same time as the automatic steering angle being calculated, its effect is also calculated, i.e., the anticipated steering wheel torque. In order to compensate for the effect, the additional automatically set steering wheel torque is calculated and taken into account when setting the automatic active steering module, designed as a steering wheel torque actuator, and also the steering column and the steering wheel.

Hence, the automatic steering interventions of the active steering system through the automatic steering angle are no longer perceived by the driver as a disturbance in the feel of the steering.

The automatic active steering system is designed and/or designated as an integral steering, for example. Regardless of the particular embodiment of the steering system, the additional automatically set steering wheel torque applied to the steering wheel from the automatic active steering module, designed as a steering wheel torque actuator, via the steering column is set in synchronized manner with the actuating of the wheels to set the at least one automatic steering angle. The additional automatically set steering wheel torque to compensate for the effect of the anticipated steering wheel torque on account of the at least one automatically set steering angle is set with the aid of this at least one automatic steering angle, which generally needs to be calculated, and/or a time derivative of this automatic steering angle, thereby avoiding time delays.

At least one automatic active steering module, which is associated with the front axle and thus the wheels of the front axle, is designed and/or designated for example as a superimposed steering. The additional automatically set steering wheel torque for the steering wheel torque actuator in one embodiment is modeled as a transfer function of the at least one automatic steering angle to the anticipated steering wheel torque as a supporting torque, controlling the anticipated steering wheel torque resulting from the automatic steering angle of the wheels of the front axle and/or an automatic active steering module for the front axle.

In order to calculate the additional automatically set steering wheel torque to compensate for the effect, the method takes into account a factor for the automatic steering angle as a given or predetermined target angle, a factor for the automatically set steering angle velocity and a factor for the automatic steering angle acceleration. Furthermore, it takes into account at least one dependency on at least one operating variable of the vehicle, i.e., the velocity, the transverse acceleration, the manual steering wheel angle, the manual steering wheel angle velocity and a manual steering wheel torque resulting from the manual steering wheel angle.

For the wheels of the rear axle, it is proposed that the at least one automatic active steering module is separated from the steering wheel and the steering column and accordingly has no direct mechanical connection to the steering wheel. Even so, it is possible for a steering angle of the rear wheels to be automatically set with the automatic active steering module for the rear axle, producing different steering angles and therefore different steering wheel torques for the wheels of the rear and the front axle. This is the case, for example, when different lateral forces are acting on the axles of the vehicle. A difference in the lateral forces on the two axles is estimated and thus determined with the aid of the single-track model in dependence on the velocity, the steering wheel angle, the steering wheel angle velocity, the yaw rate and/or the transverse acceleration, for example. Also in this case the additional automatically set steering wheel torque is used to compensate for the effect of the at least one automatically set steering angle, taking into account a factor for the automatically set steering angle as a target angle, a factor for the automatic steering angle velocity, and a factor for the automatic steering angle acceleration.

In addition, it is possible in a critical driving situation, such as an oversteering or understeering of the vehicle, to increase a value of the automatically set steering wheel torque by taking into account the at least one operating variable in dependence on a driving profile chosen by the driver.

Further benefits and embodiments of the invention will emerge from the description and the accompanying drawing.

Of course, the previously mentioned and following features yet to be explained may be used not only in the particular indicated combination, but also in other combinations or standing alone, without leaving the scope of the present invention.

BRIEF DESCRIPTION OF THE DRAWING

The invention is represented schematically with the aid of embodiments in the drawing and is described schematically and at length with reference to the drawing.

FIG. 1 shows in schematic representation an embodiment of a steering system according to the invention, implementing one embodiment of the method according to the invention.

DETAILED DESCRIPTION

FIG. 1 shows in schematic representation a vehicle 2 with a front axle 4 and a rear axle 6, wherein front wheels 8 are arranged on the front axle 4 and rear wheels 10 on the rear axle 6. The vehicle 2 comprises, for the manual steering or control of the wheels 8, 10 of at least one of the two axles 4, 6, generally at least for the manual steering of the wheels 8 of the front axle 4, a steering wheel 12 which can be operated, such as turned, by the driver of the vehicle 2, for which the driver manually sets a respectively intended or desired steering wheel angle during the driving of the vehicle 2, on which a manually set steering angle of the wheels 8, 10 is dependent. A changing of this manually set steering wheel angle corresponds to a steering wheel angle velocity, whereby the steering angle of the wheels 8, 10 results from the steering wheel angle of the steering wheel 12 and a steering angle velocity of the wheels 8, 10 results from the steering wheel angle velocity for the steering wheel 12, the steering angle velocity of the wheels 8, 10 corresponding to a time change in the steering angle for the wheels 8, 10.

This steering wheel 12 is designed as part of the embodiment of the active steering system 14 according to the invention, which furthermore comprises two automatic active steering modules 16, 17 as steering torque interfaces, a controller 18, and a steering wheel torque actuator designed as an electric motor as a third automatic active steering module 19, which is adapted to act upon a steering column 20, being connected on the one hand to the steering wheel 12 and on the other hand to the front axle 4 and the front wheels 8 across the first automatic active steering module 16. Each automatic active steering module 16, 17, 19 is adapted to set an angle, such as a steering angle of a wheel 8, 10 or a steering wheel angle of the steering wheel 12, as well as a torque, such as a steering wheel torque of the steering wheel 12 or a steering torque of a wheel 8, 10. The third automatic active steering module 19 is adapted to also set the steering angle and the steering torque of the front wheels 8 by way of the first automatic active steering module 16.

The first steering module 16 is assigned as an automatic electromechanical steering module to the front axle 4 and the front wheels 8 and it is adapted to act upon and steer the front wheels 8. The second steering module 17 is assigned here as a rear axle steering to the rear axle 6 and the rear wheels 10 and it is adapted to automatically act upon and steer the rear wheels 10.

The steering wheel 12 is connected to the steering column 20, which comprises a gearing 22. The gearing 22 is used to detect a steering desire and thus a primary steering intervention of the driver of the vehicle 2, which is manually set by the driver by way of a steering wheel angle and/or a steering wheel torque. Moreover, the gearing 22 is used to actuate the first steering module 16 by at least one signal, based on the detected primary steering intervention, and to set a manual steering angle as a primary steering reaction for the front wheels 8, being dependent on the steering wheel angle, whereby a time change in the manual steering angle corresponds to a manual steering angle velocity.

The controller 18 is adapted to monitoring the embodiment of the method according to the invention and thus to control and/or regulate it. Moreover, the controller 18 is used to generate at least one signal, as at least one operating variable of a vehicle 2, taking into account at least one operating parameter of the vehicle 2, such as a yaw rate or a yaw angle of the vehicle 2, the manually set steering angle, a manually set steering angle velocity, a velocity of the vehicle 2 and/or a transverse acceleration of the vehicle 2, by which the first steering module 16 and/or the steering module 17 is actuated. Based on the at least one signal of the controller 18, the first steering module 16 sets, as a primary steering reaction for the front wheels 8, a front automatic steering angle and optionally also a front automatic steering angle velocity and/or a front automatic steering angle acceleration. Furthermore, based on the at least one signal of the controller 18, the second steering module 17 sets, as the primary steering reaction for the rear wheels 10, a rear automatic steering angle and optionally also a rear automatic steering angle velocity and/or a rear automatic steering angle acceleration.

The controller 18 is also adapted to generate at least one signal, dependent on the at least one operating parameter, and thus to actuate the third active steering module 19 for the steering wheel 12, which in turn is adapted to set an automatic steering wheel angle as a tertiary steering intervention for the steering column 20 and thus for the steering wheel 12 and to superimpose this on a manually set steering wheel angle, also influencing a steering wheel torque. In this way, it is possible, among other things, to provide the driver with a perceptible or sensory feedback as to the behavior of the wheels 8, 10. A superimposed steering can be provided here via the third active steering module 19.

In the embodiment of the method, the driver of the vehicle 2 provides a manual steering wheel torque for the steering wheel 12 by turning the steering wheel 12 as a primary steering intervention and manually sets a steering wheel angle, whereby a steering angle is manually set for the wheels 8 of the front axle 4 as a primary steering reaction. Moreover, with at least one of the automatic active steering modules 16, 17, 19, an automatic steering angle is set for the wheels 8, 10 of at least one axle 4, 6 at least as a secondary steering intervention and/or the steering wheel angle is set for the steering wheel 12. The controller 18 is used to calculate an anticipated steering wheel torque as an effect or a secondary steering reaction, here, as a mechanical effect of this at least one automatically set steering angle on the steering wheel 12. From this effect, an additional automatically set steering wheel torque is ascertained as a tertiary steering intervention, which is applied to the steering wheel 12, and an additional steering wheel angle is automatically set in addition to the manually set steering wheel angle.

The invention claimed is:

1. A method for steering a vehicle, having a front axle with steerable wheels and a rear axle with steerable wheels, having a steering system including a steering wheel operable by a driver and at least one automatic steering module, the method comprising:
    undertaking a manual primary steering intervention by the driver of the vehicle for the steering wheel, on the basis of which a manual primary steering reaction occurs for the wheels of the front axle,
    undertaking, on the basis of the manual primary steering reaction at least one automatic secondary steering intervention with the at least one automatic steering module for the wheels of at least one axle,
    calculating an anticipated secondary steering reaction of the steering wheel as the effect of this at least one automatic secondary steering intervention,
    ascertaining an additional automatically set tertiary steering intervention from this anticipated secondary steering reaction, which is undertaken by the at least one automatic steering module for the steering wheel,
    wherein the manual primary steering intervention is undertaken by the driver of the vehicle for the steering wheel, wherein a primary manual steering wheel angle is adjusted as the angle and/or a primary manual steering wheel torque is adjusted as the torque for the steering wheel, on the basis of which the manual primary steering reaction occurs for the wheels of the front axle, wherein a primary manual steering angle is set as the angle and/or a primary manual steering torque is set as the torque for the wheels, wherein on the basis of the manual primary steering reaction the at least one automatic secondary steering intervention is undertaken with the at least one automatic steering module for the wheels of at least one axle, wherein a secondary automatic steering angle is set as the angle and/or a secondary automatic steering torque is set as the torque, wherein a secondary steering wheel angle is calculated as the angle and/or a secondary steering wheel torque is calculated as the torque of the anticipated secondary steering reaction of the steering wheel, wherein a tertiary steering wheel angle is ascertained as the angle and/or a tertiary steering wheel torque is ascertained as the torque from this anticipated secondary steering reaction as the additionally automatically occurring tertiary steering intervention, which is set by the at least one automatic steering module for the steering wheel.

2. The method according to claim 1, wherein by undertaking at least one steering intervention for at least one of the components of the steering system an angle and/or a torque is set, wherein, for at least one further component of the steering system, an angle and/or a torque is set that occurs as a steering reaction.

3. The method according to claim 2, wherein the effect of the at least one automatic secondary steering intervention is compensated with the additional automatically set tertiary steering intervention.

4. The method according to claim 2, wherein the additional tertiary steering intervention to be set automatically is determined in dependence on the at least one automatically set secondary steering intervention and/or in dependence on at least one time derivative of the automatically set secondary steering intervention.

5. The method according to claim 2, wherein the secondary steering intervention is performed for the at least one wheel and at the same time the additional automatically set tertiary steering intervention is performed for the steering wheel.

6. The method according to claim 1, wherein the primary steering wheel angle is manually set by the driver for the steering wheel while providing the manual primary steering wheel torque, by which the primary steering angle is manually set for the wheels of the front axle, wherein the at least one automatic secondary steering angle is set with the at least one automatic steering module for the wheels of the at least one axle, wherein an anticipated steering wheel torque is calculated as the effect of this at least one automatically set steering angle, wherein the additional tertiary steering wheel torque to be automatically set is ascertained from this effect and applied to the steering wheel by the at least one automatic steering module and the additional steering wheel angle is automatically set for the steering wheel.

7. The method according to claim 6, wherein the effect of the at least one automatic secondary steering intervention is compensated with the additional automatically set tertiary steering intervention.

8. The method according to claim 6, wherein the additional tertiary steering intervention to be set automatically is determined in dependence on the at least one automatically set secondary steering intervention and/or in dependence on at least one time derivative of the automatically set secondary steering intervention.

9. The method according to claim 1, wherein the effect of the at least one automatic secondary steering intervention is compensated with the additional automatically set tertiary steering intervention.

10. The method according to claim 9, wherein the additional tertiary steering intervention to be set automatically is determined in dependence on the at least one automatically set secondary steering intervention and/or in dependence on at least one time derivative of the automatically set secondary steering intervention.

11. The method according to claim 1, wherein the additional tertiary steering intervention to be set automatically is determined in dependence on the at least one automatically set secondary steering intervention and/or in dependence on at least one time derivative of the automatically set secondary steering intervention.

12. The method according to claim 1, wherein the secondary steering intervention is performed for the at least one wheel and at the same time the additional automatically set tertiary steering intervention is performed for the steering wheel.

13. The method according to claim 1, wherein the at least one automatically set secondary steering intervention, the anticipated secondary steering reaction as an effect of the at least one automatically set secondary steering intervention and/or the additional automatically set tertiary steering intervention are determined dependent upon at least one operating variable of the vehicle.

* * * * *